June 2, 1953   L. W. BUCHANAN   2,640,956

SINGLE PHASE CAPACITOR MOTOR

Filed May 16, 1950

WITNESSES:

INVENTOR

Lloyd W. Buchanan.
BY
ATTORNEY

Patented June 2, 1953

2,640,956

UNITED STATES PATENT OFFICE 2,640,956

SINGLE PHASE CAPACITOR MOTOR

Lloyd W. Buchanan, Lima, Ohio, assignor to Westinghouse Electric Corporation, East Pittsburgh, Pa., a corporation of Pennsylvania Application May 16, 1950, Serial No. 162,353

5 Claims. (Cl. 318—220)

The present invention relates to single-phase induction motors of the capacitor type, and more particularly, to means for obtaining increased starting torque and improved performance in motors of this type.

Single-phase induction motors of the capacitor type have a main primary winding and an auxiliary, or capacitor, primary winding, which are displaced from each other by approximately ninety electrical degrees on the primary member of the motor, usually the stator. A capacitor is connected in series with the auxiliary primary winding to cause the current in this winding to lead the current in the main winding when both windings are connected in parallel to a single-phase line and, since the currents in the two windings thus differ in time phase and the windings themselves are physically displaced, a starting torque is developed.

The starting torque developed in a motor of this type depends, among other things, upon the resultant or total reactance of the auxiliary winding circuit, which consists of the winding itself and the series-connected capacitor. A decrease in the resultant reactance of this circuit increases the current in the auxiliary winding and thus increases the starting torque. In conventional motors of this type, the reactance of the auxiliary winding circuit can be decreased only by increasing the size of the capacitor used, which decreases the resultant reactance since the capacitive reactance of the capacitor is usually considerably greater than the inductive reactance of the auxiliary winding.

In the single-value, or permanent-split, type of capacitor motor, the auxiliary winding remains permanently connected in parallel with the main winding during operation of the motor, and the performance thus approaches the performance of a two-phase motor. In order to obtain performance exactly equivalent to that of a two-phase motor, however, it would be necessary to change both the ratio of the turns in the main and auxiliary windings, and the value of capacitance in the auxiliary winding circuit, for each speed of the motor. This, of course, is not practical, but in the two-value type of capacitor motor, an approximation to this theoretical performance is obtained by reducing the effective value of capacitance in the auxiliary winding circuit when the motor comes up to speed, either by cutting out an extra starting capacitor or by changing the voltage on the capacitor by means of an autotransformer. Thus, in the two-value capacitor motor, a relatively high capacitance is used for starting, and the reduction in capacitance under running conditions reduces the no-load losses of the motor for a given starting torque, or makes it possible to obtain increased starting torque without exceeding a given no-load loss. This is frequently important because the no-load losses are often the limiting factor in determining the rating of a capacitor motor. The use of a two-value capacitor motor, however, is often undesirable because it involves the extra cost of an additional capacitor or of an autotransformer, as well as that of a switch or relay for changing the value of capacitance.

The principal object of the present invention is to provide a single-phase capacitor motor having increased starting torque, as compared with conventional motors, without requiring an increase in the size of the capacitor, or in which the size of the capacitor required to obtain a given starting torque is reduced.

Another object of the invention is to provide a single-phase capacitor motor in which the inductive reactance of the auxiliary winding is increased, as compared to that of a conventional motor, so that the resultant reactance of the auxiliary winding circuit is decreased, thus making it possible to obtain increased starting torque without increasing the size of the capacitor or to reduce the size of the capacitor required for a given starting torque.

A further object of the invention is to provide a capacitor motor of the single-value type in which the resultant reactance of the auxiliary winding circuit is increased as the motor passes from starting to running conditions by decreasing the inductive reactance of the auxiliary winding itself, thus obtaining a similar effect to that of decreasing the effective capacitance in the circuit and obtaining characteristics approaching those of a two-value capacitor motor, but without the extra cost.

A more specific object of the invention is to provide a single-phase capacitor motor in which magnetic material is associated with the auxiliary winding, preferably in the form of magnetic slot wedges, to increase the inductive reactance of the winding and thus reduce the resultant reactance of the auxiliary winding circuit including the capacitor, so as to obtain increased starting torque with a capacitor of given size. The magnetic slot wedges, or other magnetic material, are preferably designed to saturate when the current in the auxiliary winding rises as the motor speeds up, so that the inductive reactance of the winding decreases, thus increasing the resultant reactance of the complete auxiliary winding circuit to give the same effect as decreasing the effective capacitance in the circuit.

The invention will be more fully understood from the following detailed description, taken in connection with the accompanying drawing, in which.

Figure 1:
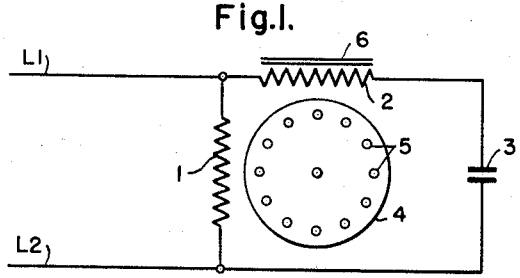
Figure 1 is a schematic wiring diagram of a capacitor motor embodying the invention.

The electrical connections of a single-value, or permanent-split, capacitor motor are shown in Figure 1. As there shown, the motor has a main primary winding 1 and an auxiliary primary winding 2, which are displaced from each other by ninety electrical degrees on the stator of the motor. A capacitor 3 is connected in series with the auxiliary winding 2, and the main and auxiliary windings are permanently connected in parallel for connection to a single-phase supply line L1, L2. The motor also has a rotor member 4 carrying a suitable secondary winding, shown as a squirrel-cage winding 5.

As explained above, when such a motor is energized, the capacitor 3 causes the current in the auxiliary winding 2 to lead the current in the main winding 1, and since these windings are physically displaced from each other, a torque is developed and the motor will start to run and accelerate to its normal speed with performance approaching that of a two-phase motor. The starting torque developed depends, among other things, upon the resultant reactance of the auxiliary winding circuit, consisting of the winding 2 and the capacitor 3. The reactance of this circuit is the resultant of the inductive reactance of the winding 2 and the capacitive reactance of the capacitor 3, which is usually considerably larger than the inductive reactance. If the resultant reactance of the auxiliary winding circuit is decreased, the current in the auxiliary winding 2 is increased and increased starting torque is obtained. In the conventional motor, however, the inductive reactance of the winding 2 cannot readily be changed, and greater starting torque can be obtained only by using a larger capacitor, which has lower capacitive reactance and thus reduces the resultant reactance of the circuit.

Figure 2:
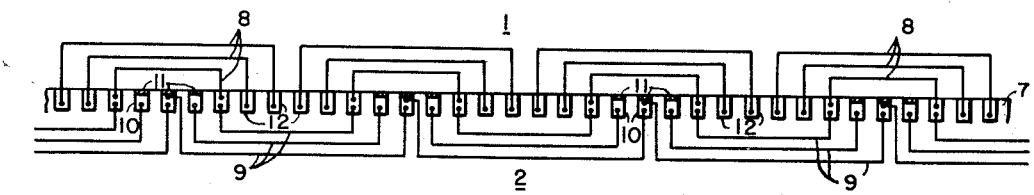
Fig. 2 is a diagrammatic developed view of the primary member or stator of a motor embodying the invention.

In accordance with the present invention, the resultant reactance of the auxiliary winding circuit is decreased by increasing the inductive reactance of the auxiliary winding 2. This is done by providing magnetic material associated with the winding 2, as indicated diagrammatically by the magnetic core 6 in Fig. 1. In the preferred arrangement, shown in Figs. 2 and 3, magnetic slot wedges are used to close the slots containing the coils of the auxiliary winding. Fig. 2 shows diagrammatically the developed stator core 7 of a four-pole motor. The core 7 is shown as having thirty-six slots in which the coils of the windings are disposed. The main winding 1 is shown as a concentric coil winding having three coils 8 per pole which are arranged concentrically in the slots of the core 7. The coils 8 may be connected together in series or in any other suitable manner. The auxiliary winding 2 may be similar to the main winding and is shown as having three coils 9 per pole, which are arranged concentrically in the slots of the core, with the coil sides placed in slots in the centers of the poles of the main winding, so that the centers of the pole groups of the two windings are displaced from each other by ninety electrical degrees. The coils 8 and 9 of the main and auxiliary windings may be connected together in any desired or usual manner, and the connections between the coils have not been shown in Fig. 2 since the precise arrangement of the winding is not a part of the invention. The particular winding shown is more or less conventional and is only illustrative since the invention is applicable to motors having any type of winding or number of poles.

Figure 3:
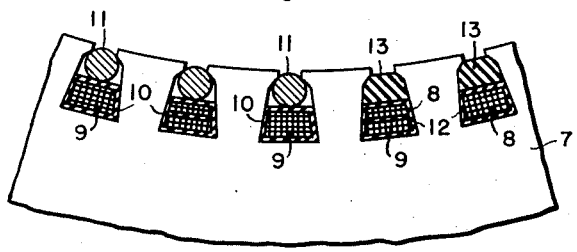
Fig. 3 is a fragmentary transverse sectional view of the stator core, showing a preferred construction.

In accordance with the present invention, the slots 10 which contain only coils 9 of the auxiliary winding 2 are closed by magnetic slot wedges 11, which as shown in Fig. 3, may consist of pieces of steel rod driven into the slots on top of the windings, or which may have any other desired configuration. The remaining slots 12 which contain coils 8 of the main winding 1, or coil sides of both windings, are closed by non-magnetic slot wedges 13 which may be of any suitable or usual type, and preferably consist of insulating material such as paper or pressboard. Thus the magnetic wedges 11 are associated only with the auxiliary winding, and do not affect the main winding.

The magnetic slot wedges 11 provide magnetic paths of high permeability surrounding the coils of the auxiliary winding, so that the leakage flux around these coils is greatly increased, and the inductive reactance of the auxiliary winding is therefore much greater than that of a similar winding with non-magnetic slot wedges. The capacitive reactance of the capacitor 3, in series with the auxiliary winding 2, is normally much larger than the inductive reactance of the winding 2. The increase in inductive reactance obtained by the use of the magnetic wedges, therefore, substantially decreases the resultant reactance of the series circuit consisting of the winding 2 and capacitor 3. This results in a larger current in the auxiliary winding 2 when the motor is started, and thus the starting torque is increased without increasing the size of the capacitor. This is an important improvement since it has heretofore been possible to increase the starting torque of a motor of this type only by using a larger capacitor with greater capacitance, and therefore lower capacitive reactance, which necessarily increases the cost. The use of the magnetic wedges makes it possible to materially increase the starting torque obtainable with a capacitor of given size, or to reduce the size of the capacitor required for a given starting torque, with resultant decrease in cost.

As previously pointed out, it is desirable to increase the resultant reactance of the auxiliary winding circuit as the motor comes up to speed, in order to reduce the no-load losses, and to obtain performance approaching that of a two-phase motor. This can readily be done by means of the present invention without requiring a change in the value of capacitance in the circuit. In a capacitor motor, the current in the auxiliary winding is relatively low under starting, or locked-rotor, conditions, and as the motor speeds up, the auxiliary winding current increases. In the preferred embodiment of the invention, the magnetic slot wedges 11 are designed to saturate as the current in the auxiliary winding 2 increases from starting to running conditions. This can readily be done by properly determining the size of the airgap between the wedges and the core, and the dimensions of the wedges. When the wedges 11 are properly designed in this way, they will not be saturated under starting conditions, with relatively low current in the winding 2, so that the winding has high inductive reactance and materially increases the starting torque, as explained above. As the motor accelerates, however, the current in the winding 2 increases and, if the wedges are properly designed, they will become saturated as the motor reaches its normal operating speed, substantially decreasing the reactance of the winding. Since the capacitive reactance in series with the auxiliary winding is ordinarily rather large, the effect of this decrease in the inductive reactance is to increase the resultant reactance of the auxiliary winding circuit. Thus, the same effect is obtained as if the effective capacitance in the circuit had been decreased by means of an auto-transformer or by cutting out a starting capacitor, but without the extra cost required by these expedients. In this way, the use of saturable magnetic slot wedges associated with the auxiliary winding makes it possible to obtain from a single-value capacitor motor performance approaching that which has previously only been obtainable by the more expensive two-value type of capacitor motor.

It should now be apparent that a capacitor motor of the single-value type has been provided which has improved starting torque and improved performance, as compared to those of conventional motors, and that these results are obtained without any material increase in cost merely by the use of the saturable magnetic slot wedges. This invention, therefore, makes it possible to increase the starting torque of a capacitor motor without increasing the size and cost of the capacitor, or to obtain a given starting torque with a smaller and therefore cheaper capacitor.

It is to be understood that the invention is not limited to the particular preferred embodiment shown and described for the purpose of illustration. Thus the magnetic wedges may also be used to increase the starting torque of motors of the capacitor-start type, in which the auxiliary winding is disconnected when the motor comes up to speed. The magnetic material used for increasing the inductance of the auxiliary winding may be provided in other ways, such as by magnetic bands on the end turns of the winding, or in any other desired manner. It is to be understood, therefore, that the invention is not restricted to the particular details of construction shown, but, in its broadest aspects, it includes all equivalent embodiments and modifications which come within the scope of the appended claims.

I claim as my invention:

1. A single-phase induction motor having a stator member and a rotor member, the stator member including a slotted stator core, a main primary winding and an auxiliary primary winding disposed in the slots of the core and physically displaced from each other, a capacitor connected in series with the auxiliary primary winding, and magnetic slot wedges in the slots which contain the auxiliary winding.

2. A single-phase induction motor having a stator member and a rotor member, the stator member including a slotted stator core, a main primary winding and an auxiliary primary winding disposed in the slots of the core and physically displaced from each other, a capacitor connected in series with the auxiliary primary winding, magnetic slot wedges closing the slots which contain the auxiliary winding, and non-magnetic slot wedges closing the remaining slots.

3. A single-phase induction motor having a stator member and a rotor member, the stator member including a slotted stator core, a main primary winding and an auxiliary primary winding disposed in the slots of the core and physically displaced from each other, a capacitor connected in series with the auxiliary primary winding, and magnetic slot wedges in the slots which contain the auxiliary winding, said magnetic slot wedges being adapted to become saturated as the current in the auxiliary winding increases from starting to running conditions.

4. A single-phase induction motor having a stator member and a rotor member, the stator member including a slotted stator core, a main primary winding and an auxiliary primary winding disposed in the slots of the core and physically displaced from each other, a capacitor connected in series with the auxiliary primary winding, magnetic slot wedges closing the slots which contain the auxiliary winding only, and non-magnetic slot wedges closing the remaining slots, said magnetic slot wedges being adapted to become saturated as the current in the auxiliary winding increases from starting to running conditions.

5. A single-phase induction motor having a stator member and a rotor member, the stator member including a slotted stator core, a main primary winding and an auxiliary primary winding disposed in the slots of the core and physically displaced from each other, a capacitor connected in series with the auxiliary primary winding, magnetic slot wedges in the slots which contain the auxiliary winding, and non-magnetic slot wedges in the remaining slots, said magnetic slot wedges being substantially unsaturated under starting conditions so that the auxiliary winding has relatively high reactance and being adapted to become saturated as the current in the auxiliary winding increases from starting to running conditions so that the reactance of the auxiliary winding is reduced.

LLOYD W. BUCHANAN.

References Cited in the file of this patent

UNITED STATES PATENTS

| Number | Name | Date |
|---|---|---|
| 598,092 | Heyland | Feb. 1, 1898 |
| 924,725 | Bergman | June 15, 1909 |
| 1,908,522 | Tyden | May 9, 1933 |
| 2,120,321 | Borgdill | June 14, 1938 |